United States Patent [19]

Seemann

[11] Patent Number: 5,487,440

[45] Date of Patent: Jan. 30, 1996

[54] ROBOTIC APPARATUS

[76] Inventor: Henry R. Seemann, 2420 N. 202 Pl., Seattle, Wash. 98133

[21] Appl. No.: 63,464

[22] Filed: May 18, 1993

[51] Int. Cl.⁶ .............................................. B62D 55/265
[52] U.S. Cl. .......................... 180/164; 180/6.7; 180/9.1; 180/901; 33/504; 356/358
[58] Field of Search .................................. 180/164, 167, 180/168, 169, 8.7, 9, 9.1, 9.32, 901, 904, 6, 7; 33/501.4, 504, 556, 558, 559, 561; 305/60; 356/358, 375, 376; 901/1

[56] References Cited

U.S. PATENT DOCUMENTS

| | | | |
|---|---|---|---|
| 3,470,739 | 10/1969 | Takafuji et al. | 33/504 |
| 3,682,265 | 8/1972 | Hiraoka et al. | 180/9.2 R |
| 3,777,834 | 12/1973 | Hiroaka et al. | 180/9.44 |
| 4,029,164 | 6/1977 | Urakami . | |
| 4,092,942 | 6/1978 | Kurojiji et al. | 114/220 |
| 4,095,378 | 6/1978 | Urakami et al. | 51/425 |
| 4,132,279 | 1/1979 | van der Lende et al. | 180/9.5 |
| 4,621,926 | 11/1986 | Merry et al. | 356/363 |
| 4,664,212 | 5/1987 | Nagatsuka et al. | 180/164 |
| 4,666,114 | 5/1987 | Krocyznsky et al. | 248/205.6 |
| 4,674,949 | 6/1987 | Krocyznski | 414/750 |
| 4,714,339 | 12/1987 | Lau et al. | 356/4.5 |
| 4,789,037 | 12/1988 | Kneebone | 180/901 |
| 4,809,383 | 3/1989 | Urakami | 15/98 |
| 4,860,400 | 8/1989 | Urakami | 15/98 |
| 4,890,567 | 1/1990 | Caduff | 114/222 |
| 4,926,957 | 5/1990 | Urakami | 180/164 |
| 4,934,475 | 6/1990 | Urakami | 180/164 |
| 4,991,673 | 2/1991 | Ericsson | 180/9.1 |
| 5,363,935 | 11/1994 | Schempf et al. | 180/901 |

FOREIGN PATENT DOCUMENTS

| | | | |
|---|---|---|---|
| 0195474 | 11/1984 | Japan | 180/901 |
| 0014207 | 1/1988 | Japan | 180/901 |
| 0000581 | 1/1991 | Japan | 180/164 |
| 404154494 | 5/1992 | Japan | 180/164 |
| 405050955 | 3/1993 | Japan | 180/901 |

Primary Examiner—Ann Marie Boehler
Attorney, Agent, or Firm—Andrus, Sceales, Starke & Sawall

[57] ABSTRACT

A robot for performing a working operation on a surface. The robot comprises a frame which supports a pair of parallel tracks. An endless link chain is mounted for travel on each track and each chain is driven by an independent motor mounted on the frame. Each track is provided with at least two recesses with each recess having an open side facing the respective chain. A series of vacuum cups are mounted on each chain and are adapted to engage the surface to be traversed. A first series of ports connect a first recess of each track and a first group of vacuum cups on each chain, while a second series of ports communicate between the second recess of each track and a second group of vacuum cups. A source of vacuum is connected to the recesses and acts through the ports to the respective vacuum cups to enable the vacuum cups to grip the surface. In a preferred manner of use, the robot is employed with a laser tracking system in the non-destructive inspection of an aircraft.

28 Claims, 4 Drawing Sheets

ROBOTIC APPARATUS

BACKGROUND OF THE INVENTION

Robotic devices have been proposed for performing a working operation, such as cleaning or polishing surfaces, that are not accessible to normal manual operations. In general, the robotic devices have been used on flat or planer surfaces such as windows, building panels and the like. The typical robotic device includes a pair of endless belts or tracks, each carrying a series of vacuum cups. The belts are independently and remotely driven to move the device across the surface to be treated, and a source of vacuum, such as a vacuum pump, is connected to the vacuum cups to create a negative pressure within the cups so that the cups can grip the surface and enable the robotic device to move over inclined or vertical surfaces. A typical robotic device can operate on smooth continuous surfaces but if the device moves across an obstruction or crack in a vertical or inclined surface, the vacuum may be lost, resulting in the device falling from the surface.

Large commercial aircraft are normally washed and waxed every thirty days. Because of the large size and shape of the aircraft it is customary to erect a scaffold along side the aircraft and a number of workers supported on the scaffold then hand scrub the outer surface of the aircraft. After scrubbing, the aircraft is waxed and polished using manual rotary buffers. The buffers are relatively heavy and due to the large surface area of the aircraft a buffing operation is a tedious and time consuming operation. The entire operation of scrubbing, waxing and buffing the aircraft usually takes a period of 20 to 30 hours utilizing 10 workers.

Commercial aircraft are also subjected to a non-destructive inspection after 7,000 cycles of pressurization. Each take-off and landing in which the aircraft is pressurized is considered to be a pressurization cycle. In the typical non-destructive inspection, the paint is stripped entirely from the aircraft and the seams and rivets are manually inspected. If a defect is observed during the inspection, the area of the defect is marked and is subjected to an eddy-current sensor to determine the magnitude of the defect. After the manual inspection the aircraft is repainted and subsequently waxed and buffed.

The normal paint stripping, inspecting, repainting and waxing operation is extremely time-consuming and labor intensive, resulting in a substantial expenditure. As a further problem the paint stripping operation presents a serious environmental problem, in that methylene chloride is generally used as the solvent to remove the paint and for a large aircraft, such as a Boeing 747, upwards of 1,000 gallons of methylene chloride may be required to strip the paint from the aircraft. As methylene chloride is toxic and presents an environmental problem, pollution abatement equipment is necessary in order to remove the solvent fumes from the paint stripping area.

SUMMARY OF THE INVENTION

The invention is directed to a robotic device for performing a working operation on a surface and has particular application to performing a working operation on a contoured surface having surface irregularities such as encountered in a commercial aircraft.

The robotic device Comprises a supporting structure or frame which supports an outer open bottom housing or hood. A pair of flexible tracks are mounted on the frame and an endless member, such as a link chain, is mounted for travel on each of the tracks. Each chain in independently driven by a separate motor which is mounted on the frame.

Each of the tracks is formed with at least two channels with each channel having an open side facing the respective chain. A series of vacuum cups are mounted on each chain and a series of first ports are connected between a first of the channels of each track and a first group of vacuum cups, while a second series of ports provide communication between a second channel of each track and a second group of vacuum cups. The first and second groups of vacuum cups are preferably in alternating sequence.

Negative pressure or a vacuum is applied to each channel and hence through the ports to the vacuum cups, thus enabling the cups to grip a surface to be traversed.

In a preferred form of the invention, each track is formed with two pair of side-by-side channels and the vacuum is applied independently to all four channels. In this embodiment, a first series of ports in the chain register with the first and third channels, while a second series of ports in the chain register with the second and fourth channels. As the vacuum is applied independently to the several channels, the robotic device can move over gaps or obstructions in the surface without losing vacuum in all of the vacuum cups. If for example, the device moves over a crack causing a loss of vacuum in one of the track channels, the vacuum will be retained in the remaining channels to thereby maintain the device in gripping contact with the surface.

In a preferred embodiment the robotic device is employed for non-destructive inspection of aircraft using a laser tracking system. In this embodiment one or more laser units are mounted on the ground adjacent the aircraft and a retro-reflector or cats-eye is mounted on a support carried by the robotic device. The support is slidable relative to the robotic device and is biased downwardly so that a shoe or sensor carried by the support will ride against the surface of the aircraft. As the robotic device moves in the desired path of travel over the aircraft surface, the sensor or shoe rides on the surface, and through the laser tracking system, the surface of the aircraft is mapped. The aircraft is then pressurized and the surface is again mapped and any surface deviations, outside of a given tolerance, indicate possible defects in the aircraft surface.

The use of the robotic device along with the laser tracking system, to provide non-destructive inspection of a aircraft, eliminates the manual paint stripping, visual inspection, repainting and waxing of the aircraft as is normally used and therefore substantially reduces the overall time and cost of the non-destructive inspection. As a further advantage, the method of the invention eliminates the use of toxic solvents which are normally used to strip the paint from the aircraft and correspondingly eliminates the pollution control devices that are necessary with the use of such solvents.

In a second embodiment of the invention the robotic device can be employed to move a working implement over the aircraft or other surface. The working implement can be a rotary scrubber, buffer, paint sprayer, or the like. By utilizing the robotic device to perform these working operations the extensive hand labor normally required to wash, wax and or paint an aircraft or other surface is substantially reduced. As a further advantage, a robotic device enables a constant application of pressure to be applied through the implement to the surface thus providing a more uniform cleaning and polishing operation.

The invention also can include a safety feature to prevent the robotic device from falling from the surface in the event of failure of the vacuum system. In this regard, a fan is mounted in an opening or aperture in the outer housing and if the magnitude of the vacuum drops beneath a preselected value, the fan is operated to create a negative pressure within the outer housing or hood to prevent the robotic device from falling from the surface.

The robotic device of the invention has the advantage that it is capable of moving over surface deviations, such as obstructions or gaps without losing vacuum. Moreover the frame is composed of flexible plastic material which enables the robotic device to follow the curved contour of an aircraft or other surface to be treated.

Other objects and advantages will appear during the course of the following description.

DESCRIPTION OF THE DRAWINGS

The drawings illustrate the best mode presently contemplated for carrying out the invention.

In the drawings

FIG. 6 is an enlarged fragmentary longitudinal section showing the engagement of the chain with a drive sprocket; and FIG. 7 is a schematic view showing the use of the robotic device along with a laser tracking system in the non-destructive inspection of an aircraft.

DESCRIPTION OF THE ILLUSTRATED EMBODIMENT

Figure 1:
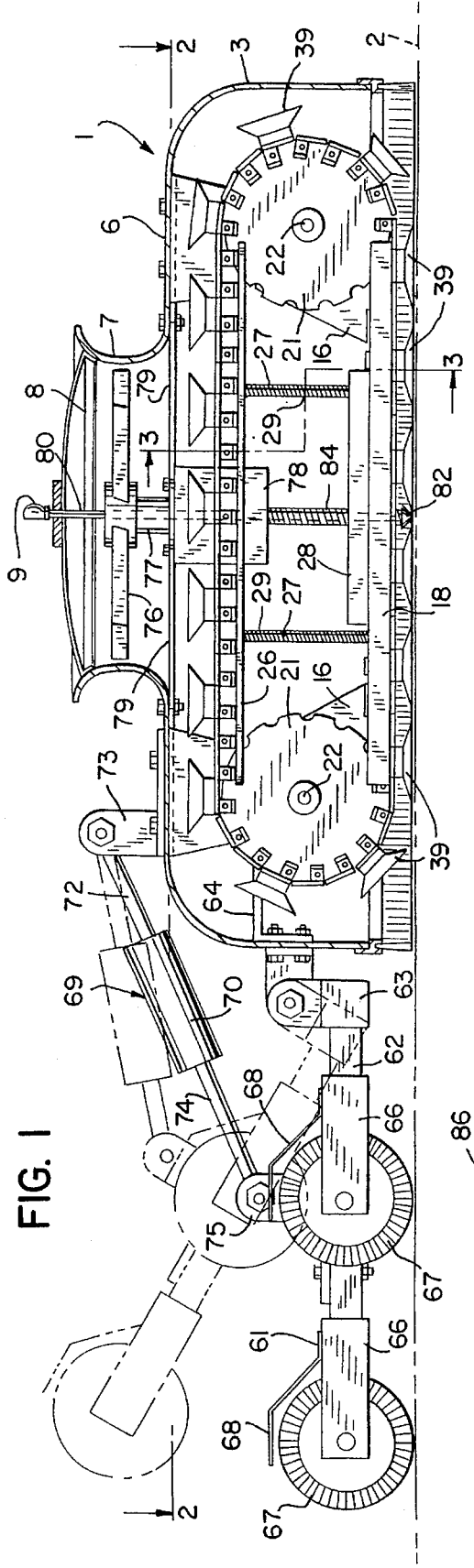
FIG. 1 is a longitudinal section of the robotic device of the invention.

FIGS. 1–6 show a robotic device 1 that can be employed to provide a working operation on a surface 2. Surface 2 can either be a planer or non-planer surface, such as an aircraft, building, bridge, storage tank, train or the like.

Robotic device 1 includes an outer open bottom housing or hood 3, which is supported by an internal frame 4. Housing 3 is composed of a rectangular side wall 5 and a generally flat upper surface or top 6, having an opening therein which is bordered by a generally curved upwardly extending flange 7. A series of braces 8 extend diametrically across the opening in flange 7 and support a retro-reflector or cats-eye 9 to be used in a laser tracking system, as will be hereinafter described.

Figure 3:
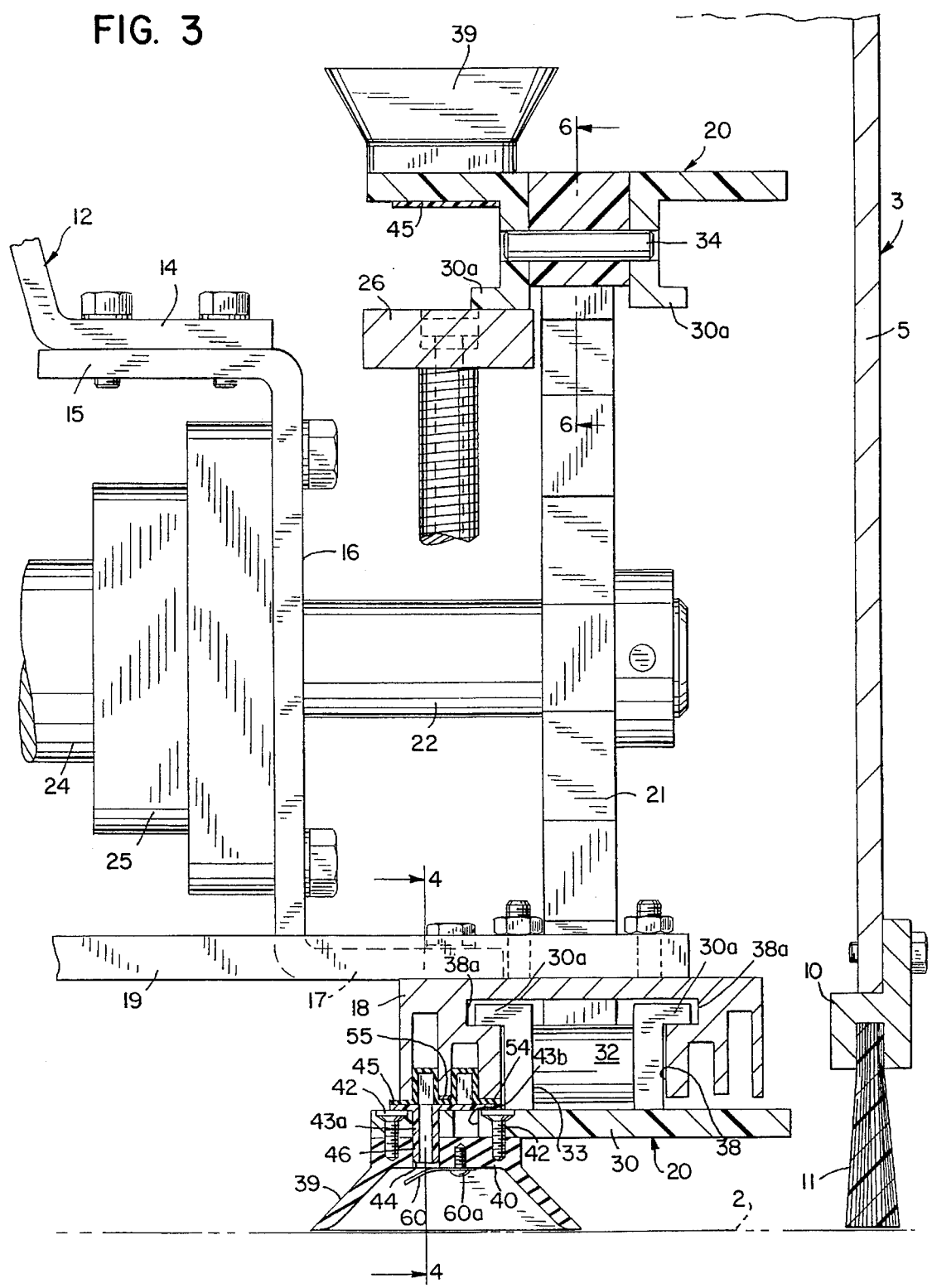
FIG. 3 is a section taken along line 3—3 of FIG. 2 and showing the connection of the drive to one of the chains.

Secured to the lower edge of sidewall 5 is a strip 10 having a downwardly facing groove which receives the upper edge of a brush seal 11, as shown in FIG. 3. Brush seal 11 includes a plurality of fine, synthetic, flexible bristles formed of a material such as nylon which engage the surface 2 and provide a seal to the surface.

Frame 4 consists of a pair of inverted V-shape frame members 12 which extend transversely of the housing 3 and each frame member 12 includes an upper flat section 13, which is secured to the under surface 6 of housing 3. In addition, each frame member 12 is provided with a pair of lower, horizontal flanges 14 and each flange 14 is secured to the upper flange 15 of a bracket 16, as best shown in FIG. 3. With this construction there are four brackets 16 with a pair of the brackets being located along each side of the device.

Each bracket 16 also includes a lower flange 17 which extends outwardly and is secured to the upper surface of a flexible-track or guide 18, as seen in FIG. 3. Each track 18 is preferably formed of plastic material and is connected between a pair of the brackets 16. In addition, a pair of braces 19 extend transversely of the device and connect the tracks 18 together.

Tracks 18 serve to guide the lower run of an endless link chain 20 as shown in FIG. 3.

To drive the chains 20 in their endless paths of travel, a sprocket 21 is mounted for rotation outwardly of each bracket 16 and the sprockets on each side of the frame are engaged with the respective chain. Each sprocket 21 is carried by a shaft 22 which extends outwardly from the respective bracket 16, as shown in FIG. 3. The ends of each track, as illustrated in FIG. 5, are provided with longitudinal, open-ended slots 23 which receive the respective sprockets 21.

One sprocket of each longitudinal pair is an idler sprocket, while the other sprocket 21 of each longitudinal pair is a driven sprocket. To drive the sprockets 21*b*, an electric motor 24 is located inwardly of the bracket 16 and operates through a gear box 25 with the output shaft of the gear box connected to the shaft 22 of the driven sprocket 21. A separate motor 24 is utilized with each driven sprocket 21. Thus operation of the motors 24 acting through the sprockets 21 will drive the respective chain 20 to move the robotic device in the desired path of travel along the surface 2.

As best seen in FIG. 1 the upper run of each chain 20 is supported on a guide bar 26. A pair of rods 27 extend downwardly from each guide bar 26 and the lower end of one of the rods is connected to the respective track 18, while the lower end of the second rod is connected to a manifold block 28, which is mounted on the track 18. Coil springs 29 are located about the rods 27 and urge the guide bar 26 upwardly thereby acting to tension the chain 20.

Figure 5:
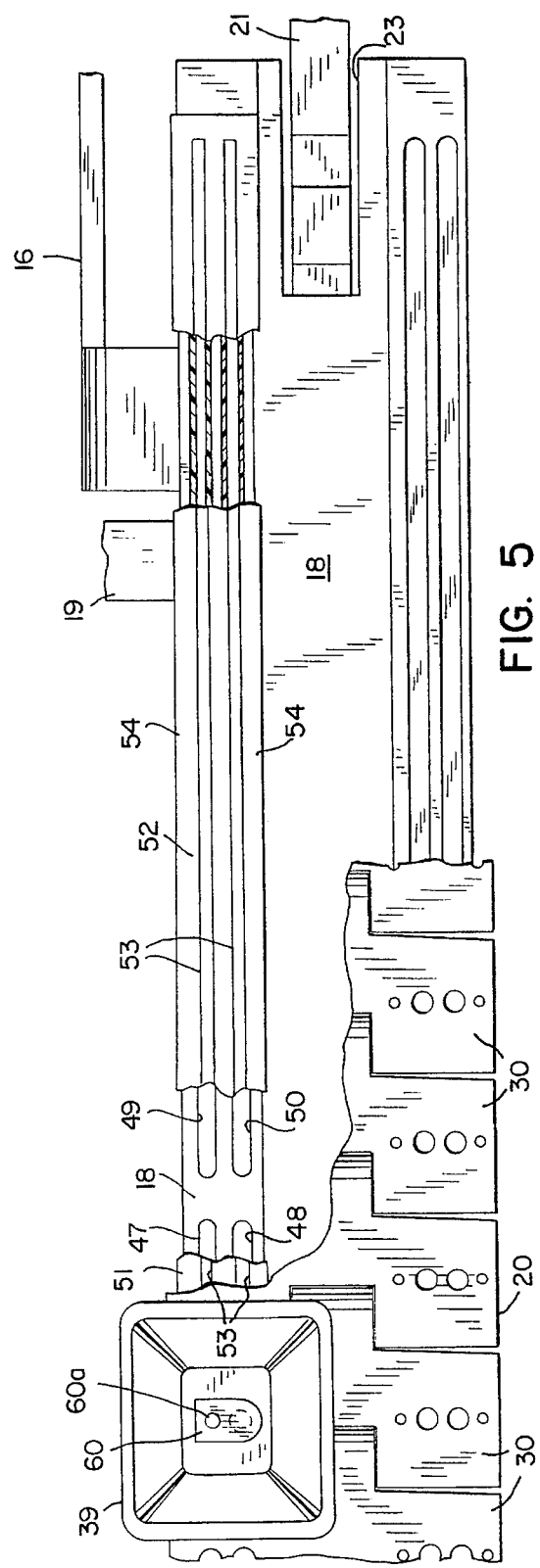
FIG. 5 is a bottom view of the track with parts broken away.

The construction of each link chain 20 is best illustrated in FIGS. 3, 5 and 6. Each chain 20 is composed of a series of pivotally interconnected links 30 and a boss or tubular projection 32 extends outwardly from one side of each link 30 and is received within a flanged recess 33 in the adjacent link. Pins 34 provide a pivotal connection between the boss 32 of one link and the hinged recess 33 of the adjacent link. The hinged bosses 32 are adapted to be engaged by notches 35 in the respective sprockets 21, as best seen in FIG. 6.

As shown in FIG. 3, the hinged connections 32 of chain 20 are guided for movement within a central groove 38 in track 18 and each chain link is provided with a pair of outwardly extending ears or flanges 30*a* which are received within guideways 38*a* in the track. The engagement of flanges 30*a* with guideways 38*a* prevents downward displacement of the chain 20 from track 18.

A series or row of vacuum cups 39 are mounted on the outer surface of each chain 20, as shown in FIG. 3. The base 40 of each cup 39 is secured by screws 42 to the chain links 30. Each chain link 30 is provided with a pair of side-by-side holes 43*a* and 43*b*, and one of the holes 43*a* registers with a hole 44 in the base 40 of the vacuum cup 39.

Mounted on the upper surface of chain 20, as shown in FIG. 3, is a flexible plastic belt 45. A series of tubes 46 are formed integrally with the belt and project through the aligned holes 43 and 44 in chain links 30 and vacuum cup 39. as shown in FIG. 3. One group of vacuum cups 39 have holes 44 aligned with holes 43a, while a second group of vacuum cups have holes 44 aligned with holes 43b. Preferably the two groups of vacuum cups are in alternating sequence. Accordingly, the tubes 46 are staggered and are inserted within the aligned openings 43a and 44, or 43b and 44.

The surface of each track 18 facing chain 20 is formed with four grooves or recesses 47, 48, 49 and 50. As seen in FIG. 5, grooves 47 and 48 are in side-by-side relation and grooves 49 and 50 are in side-by-side relation and are spaced longitudinal from grooves 47 and 48.

A flexible trough or channel member 51 is mounted within grooves 47 and 48, and similarly a flexible channel member or trough 52 is mounted in grooves 49 and 50. Each channel member 51 and 52 includes a pair of side by side channels 53 and the channels 53 of channel member 51 are located within grooves 47 and 48, while the channels 53 of channel member 52 are located within grooves 49 and 50. Each channel member 51 and 52 is provided with a flexible peripheral lip 54 which is engaged with and rides against of belt 45, as shown in FIG. 3, thus providing a seal between the channels and the belt.

The channel members 51 and 52 are urged in a direction toward the respective chain 20 by a waffle spring 55 which is located between the central portion of each channel member and the lower surface of the track 18 as seen in FIG. 3.

Figure 4:
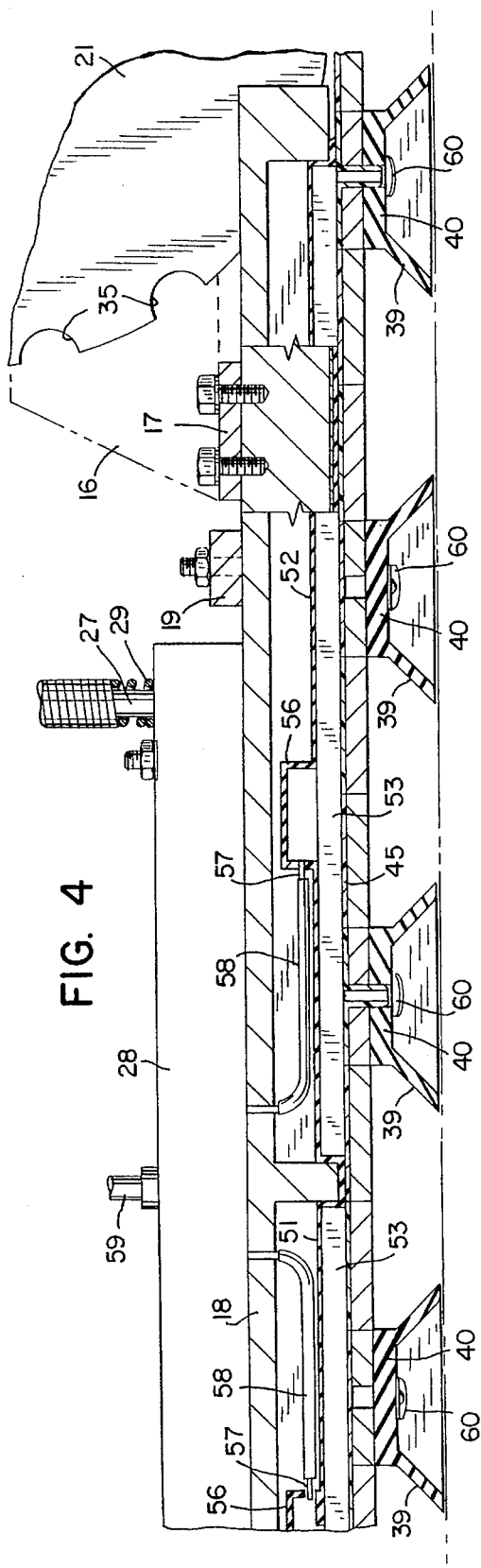
FIG. 4 is an enlarged fragmentary longitudinal section taken along line 4—4 of FIG. 3 and showing the vacuum connection the vacuum cups.

As best illustrated in FIG. 4, a block 56 is formed integrally with the upper surface of each channel member 51 and 52, and a nipple 57 extends outwardly from each block. Each nipple is connected through an internal passage in block 56 with the interior of the respective channel 53. Tubes 58 connect nipples 57 to manifold block 28 which is mounted on the track 18. A source of negative pressure or vacuum, such as a vacuum pump, is connected through conduit 59 to manifold 28 and through suitable valving in the manifold the negative pressure is applied through tubes 58 to the four channels 53. The negative pressure is then applied from each channel 53 through tube 46 in belt 45 to the corresponding vacuum cups 39. The use of the multiple channels 53, each being individually connected to a source of vacuum, prevents the entire loss of vacuum to the robot if the robot should traverse an obstruction, crack or other surface deviation. For example, if the robot should move longitudinally over an elongated crack with the crack being aligned with the grooves 47 and 48, the vacuum in the channels 53 located in grooves 47 and 48 may be lost, but the vacuum will be retained in the channels 53 located in the grooves 49 and 50, thus preventing the robot from falling from a vertical or inclined surface. Similarly, if the robot should move across a transverse crack the vacuum may be lost in a pair of side-by-side channels 53, but the other pair of side by side channels will retain the vacuum to maintain the robot in contact with the surface.

In addition, a flexible valve member 60 is connected by screw 60a to the base 40 of each vacuum cup 39 and is in registry with hole 44. Valve member 60 is contoured so that it is normally open, as shown in FIG. 3 to permit vacuum to be drawn in cup 39. However, if cup 39 should travel over a crack or obstruction in surface 2 causing air to enter the cup, the pressure differential will move valve member 60 to a closed position relative to hole 44 to prevent the air entering cup 39 from flowing to the manifold block 28.

Figure 2:
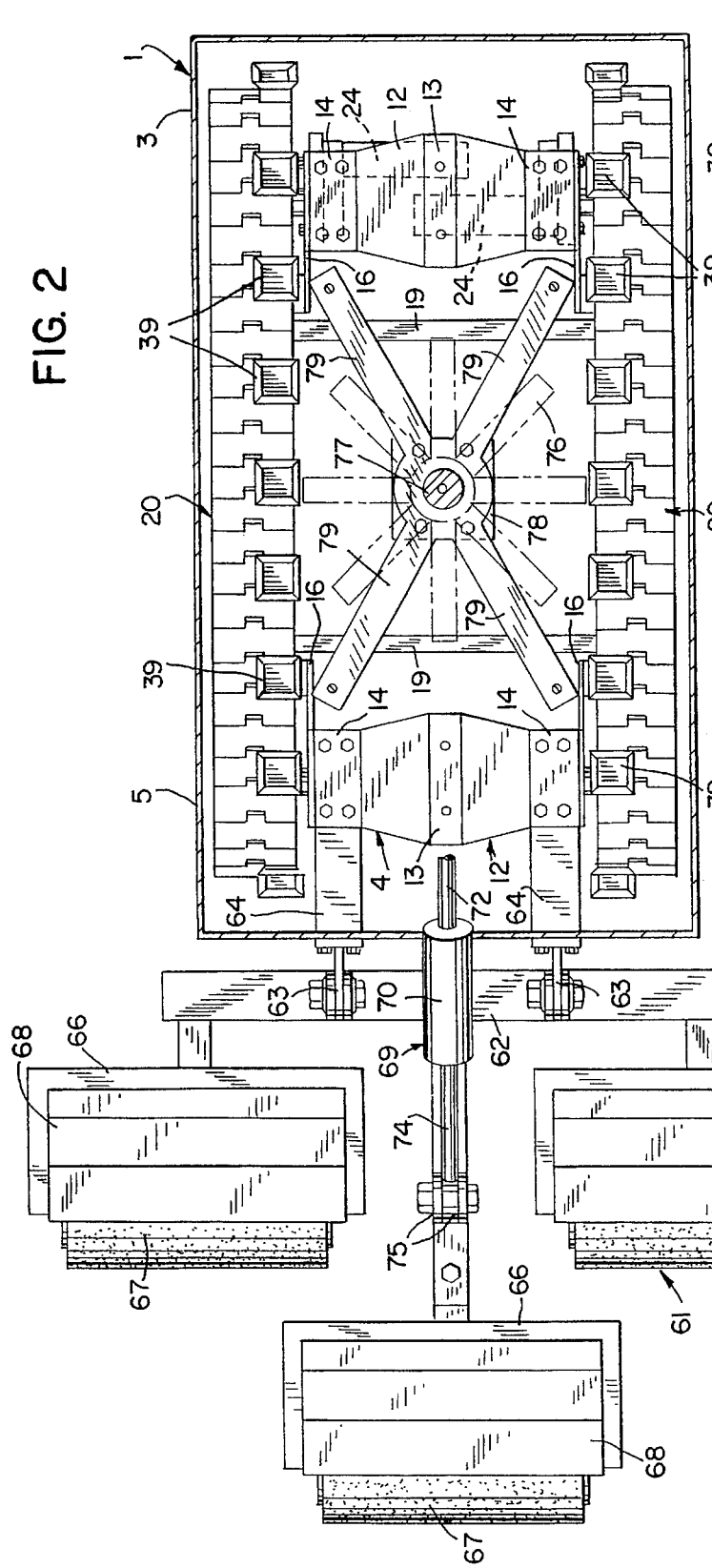
FIG. 2 is a section taken along line 2—2 of FIG. 1.

The robotic device, as illustrated in FIGS. 1 and 2, can be used to move a working implement or attachment 61 across the surface 2 to be treated. The attachment 61 includes a frame 62, which is pivotally connected to a pair of lugs 63 that extend rearwardly from generally L-shaped brackets 64, that are connected to the rear frame member 12, as best in FIG. 2. Three yokes 66 are connected to frame 63 and a rotary buffer 67 is mounted for rotation in each yoke 66. The buffers 67 are designed to be individually rotated by drive motors located internally of the buffers, not shown. Suitable shields 68 are connected to the yokes and extend partially over the buffers 67 to confine spray from the buffers.

The buffers 67 are urged downwardly into contact with surface 2 by an air cylinder unit 69. Cylinder unit 69 includes a cylinder 70 and a rod 72 is connected to one end of the cylinder and is pivotally connected to a pair of lugs 73 which project upwardly from housing 3. A piston is slidable within cylinder 70 and a piston rod 74, which is connected to the piston, extends from the opposite end of the cylinder and is pivotally connected to lugs 75 that extend upwardly from frame 62. By extending cylinder unit 69, down pressure can be applied through buffer 67 to surface 2. By retracting the cylinder unit 69, the frame 62 and buffers 67 can be pivoted upwardly out of contact with surface 2, as shown by the dashed lines in FIG. 1.

While the drawings illustrate the working implements to take the form of rotary buffer 67, it is contemplated that various types of working implements can be substituted, such as scrubbers, waxers, paint applicators and the like.

As a feature of the invention, a provision is incorporated to prevent the robot from falling from a vertical or inclined surface 2 in the event there is a failure in the vacuum system. In this regard, a fan 76 is mounted in the opening in flange 7 which extends upwardly from housing 3. Fan 76 includes a hollow vertical shaft 77 which is driven by a motor 78. Motor 78 is supported within the opening in flange 7 by a series of diametrically extending braces 79.

A sensor, not shown, will sense the magnitude of the vacuum or negative pressure in the vacuum system. If the vacuum decreases to a pre-selected value, the fan 76 will be operated to create a negative pressure within the housing 3 to prevent the robot from falling from surface 2. The brush seal 11 which is mounted on the peripheral edge of the housing 3 and is engaged with the surface 2, cooperates with the fan to enable a negative pressure to be created within the housing.

FIG. 7 illustrates a preferred embodiment of the invention in which the robot 1 is utilized for nondestructive inspection of an aircraft. In this embodiment, the retro-reflector or cat's eye 9 is mounted on the upper end of a rod 80 that is slidable within the hollow fan shaft 77. The lower portion of rod 80 extends freely through motor 78 and the lower end of the rod 1 is provided with a sensor or shoe 82, which is adapted to ride on the surface 2 of aircraft 83. Sensor 82 is biased downwardly against the aircraft surface 2 by a coil spring 84, which is interposed between the motor 78 and the upper surface of the sensor.

In the non-destructive inspection system, one or more robots 1 are mounted to travel across the surface of the aircraft 83, as illustrated in FIG. 8. In practice, three robots 1 can be utilized along with six laser tracking units 85 when inspecting a large commercial aircraft. As shown in FIG. 7, a movable carriage 86 is associated with each robot and includes a vacuum pump, that is connected by a suitable conduit 87 to the manifolds 28 on the robot. In addition, electric feed lines not shown, are connected between the carriage 86 and the robot 1. As illustrated in FIG. 7, one of the carriages 86 is mounted to travel on an overhead track 88 and is connected to a robot 1 which is adapted to move across the upper surfaces of the aircraft 83, while a second carriage 85 travels on the ground and is operably connected to a second robot 1 that traverses the lower surface of the aircraft.

In carrying out the non-destructive inspection, the vacuum system is initially started to create a vacuum in the vacuum cups and enable the robot to adhere to the surface of the aircraft 83. The aircraft has certain tooling locations, or depressions, located at various positions on the buoyancy line, which are used as reference points to take dimensions during the manufacture and set-up of the aircraft. These depressed reference points are generally referred to as fiducials. Through a radio controlled unit, the motors 24 on the robot 1 are then actuated to move the robot over the aircraft surface until the sensor 82 is engaged with a fiducial. Through the computer of the laser system, this is established as an origin point.

As a large aircraft generally has a number of fiducials, the robot is moved and engaged with each fiducial to obtain a series of origin points.

The desired operating program as selected in the computer, then actuates the program to operate the motors 24 to move the robot in the desired path of travel on the aircraft surface. At this time, the interior of the aircraft is under atmospheric pressure. As the robot moves across the aircraft surface the sensor 82 will ride on the surface and will move relative to the frame of the robot.

As described in the tracking system of U.S. Pat. No. 4,714,339, a laser beam is directed from tracking unit 85 to the target, which is the retro-reflector 9 mounted on housing 3, and the retro-reflector reflects a beam back to a tracking unit 85. Photosensors attached to the tracking unit provide error signals to a servo system, which controls optics at the tracking unit to provide the direction necessary to accomplish the coincidence of the beams. The separation of the incident or source beam and the reflected beam are measured and by measuring the direction of the beams relative to the tracking unit or tracking point, the target can be located in spatial coordinates and the orientation of the retro-reflector 9 can be continuously determined, thus providing a surface map of the aircraft.

After the surface mapping of the entire aircraft has been completed, the interior of the aircraft is then pressurized at about 1 atmosphere of pressure and the surface mapping operation is repeated. If any portion of the aircraft surface shows a deviation under pressurized conditions beyond a given tolerance it can indicate a potential defect in the surface, such as a crack or faulty rivet. Any potential defective area can then be manually inspected.

By using the robot 1 in conjunction with a laser tracking system, surface mapping of the aircraft can be accomplished to determine potential areas of defect without the necessity of stripping paint from the aircraft surface and without the need of a manual inspection of the entire aircraft surface. As the paint stripping, manual inspection, repainting and waxing operations are eliminated, the overall time and cost for the inspection is greatly reduced.

As a further and important advantage, the invention eliminates the need of incorporating pollution control equipment, which is necessary for normal paint stripping operations. Stripping of the paint from a large commercial aircraft, such as a Boeing 747, normally requires more than 1,000 gallons of solvent, such as methylene chloride. As the solvent is toxic, and creates a potential environmental hazard, pollution control equipment is necessary to restrict the escape of solvent vapors.

It is preferred that tracks 18, as well as frame 4, be constructed of flexible plastic material so that the robot can conform to contoured surfaces.

Various modes of carrying out the invention are contemplated as being within the scope of the following claims, particularly pointing out and distinctly claiming the subject matter which is regarded as the invention.

I claim:

1. A robotic apparatus for traversing a surface, comprising a supporting structure, a pair of parallel tracks, an endless member mounted for travel on each track, drive means for driving each endless member in a path of travel, each track including a first recess and a second recess, said recesses disposed in side-by-side laterally spaced relation, said recesses each having an open side facing the respective endless member, a plurality of vacuum cups mounted on each endless member, first port means providing communication between said first recess of each track and a first group of vacuum cups, second port means providing communication between the second recess of each track and a second group of said vacuum cups, and vacuum means for creating a negative pressure in each recess.

2. The apparatus of claim 1, wherein said drive means comprises a pair of separate drive members each being operably connected to an endless member.

3. The apparatus of claim 1, wherein said endless member comprises a link chain.

4. The apparatus of claim 1, and including a belt secured to a surface of each endless member and disposed to ride against the respective track.

5. The apparatus of claim 4, wherein each belt includes a plurality tubular members, each tubular member disposed in said first and second port means to provide communication between each recess and the respective vacuum cup.

6. The apparatus of claim 1, wherein said tracks are flexible and enable said robotic apparatus to conform to contoured surfaces.

7. The apparatus of claim 1, wherein said supporting structure includes an outer open bottom hood, and a flexible brush seal mounted on the peripheral edge of the hood bordering the open bottom and disposed to sealingly engage said surface.

8. The apparatus of claim 7, wherein said hood is provided with an aperture spaced from said open bottom, said apparatus including blower means communicating with said aperture for creating a negative pressure within the hood to prevent the robotic apparatus from falling from said surface in the event of a failure of said vacuum means.

9. The apparatus of claim 8, wherein said aperture is disposed in the upper surface of said hood and said blower means is mounted in said aperture.

10. The apparatus of claim 1, and including a working attachment connected to said supporting surface and constructed to perform a working operation on the surface.

11. The apparatus of claim 10, and including means for applying down pressure to said attachment to urge said attachment against said surface.

12. A robotic apparatus for traversing a surface, comprising a supporting frame, a pair of parallel tracks, a pair of endless members each mounted for travel in an upper run and a lower run, the lower run of each endless member being guided in travel on the respective track, a pair of separate drive members each operably connected to one of said endless members to move the endless member in travel on said track, each track including a first recess, a second recess, a third recess and a fourth recess, said recesses each having an open side facing the respective endless member, said first and second recesses being spaced laterally of each other and said third and fourth recesses being spaced laterally from each other and being longitudinally aligned with the first and second recesses respectfully, a plurality of vacuum cups mounted on each endless member, a plurality of first ports in each endless member providing communication between the first and third recesses and a first group of said vacuum cups, a plurality of second ports in each endless member providing communication between the second and fourth recesses and a second group of said vacuum cups, and vacuum means for creating a negative pressure in each recess.

13. The apparatus of claim 12, and including an endless belt mounted on a surface of each endless member and disposed to engage the respective track as the endless member moves in its path of travel, said belt having a plurality of holes each aligned with the ports in the endless member.

14. A robotic apparatus for traversing a surface, comprising a supporting frame, a pair of endless members mounted for movement on said frame, each endless member having an upper run and a lower run disposed to engage the surface, drive means operably connected to said endless members for moving said endless members in a path of travel to move said apparatus in a direction over the surface, a plurality of vacuum cups mounted on each endless member, vacuum means for creating a negative pressure in the vacuum cups disposed in the lower run of each endless member, and a laser beam retro reflector mounted on the frame in position to receive and reflect a laser beam from a laser tracking unit.

15. The apparatus of claim 14, wherein said retro reflector is mounted generally centrally of said frame and projects upwardly above said frame.

16. A robotic apparatus for traversing a surface, comprising a supporting frame, a pair of endless members mounted for movement on said frame, each endless member having an upper run and a lower run disposed to engage the surface, drive means operably connected to said endless members for moving said endless members in a path of travel to move said apparatus in a direction over the surface, a plurality of vacuum cups mounted on each endless member, vacuum means for creating a negative pressure in the vacuum cups disposed in the lower run of each endless member, surface sensing means mounted on the frame and disposed to ride on the surface as the apparatus traverses said surface, said surface sensing means being movable in accordance with deviations in said surface in a second direction at an angle to the direction of movement of the apparatus, and means responsive to movement of said surface sensing means in said second direction to generate a surface map of said surface.

17. The apparatus of claim 16, wherein said surface sensing means comprises a sensing member, and means for mounting said sensing member for movement in said second direction, said second direction being generally normal to a plane extending through the lower runs of said endless members.

18. The apparatus of claim 17, and including biasing means for biasing the sensing member toward said surface.

19. The apparatus of claim 16, wherein said sensing means comprises a sensing member disposed to ride on said surface, a support to carry said sensing member, means for mounting the support for sliding movement relative to said frame in said direction, and biasing means for biasing the sensing member toward said surface.

20. A combination, comprising a robotic apparatus for traversing a surface and having a supporting frame, a pair of endless members mounted for movement on said frame, each endless member having an upper run and a lower run disposed to engage the surface, drive means operably connected to said endless members for moving said endless members in a path of travel to move said apparatus in a direction over the surface, a plurality of vacuum cups mounted on each endless member, vacuum means for creating a negative pressure in the vacuum cups disposed in the lower run of each endless member, and a laser tracking unit including laser beam generating means located at a remote location relative to said robotic apparatus for generating an incident laser beam, a laser beam retro reflector mounted on the frame in position to receive and reflect said incident laser beam, said laser tracking unit also including means for comparing the incident beam and the reflected beam to provide a measurement of the spatial coordinates of the retro reflector.

21. A robotic apparatus for traversing a surface, comprising a supporting structure, a pair of parallel tracks, an endless member mounted for travel on each track, drive means for driving each endless member in a path of travel, each track including a first recess and a second recess, said recesses each having an open side facing the respective endless member, a plurality of vacuum cups mounted on each endless member, first port means providing communication between said first recess of each track and a first group of vacuum cups, second port means providing communication between the second recess of each track and a second group of said vacuum cups, a flexible channel member disposed in each recess, each channel member having an open side facing the respective endless member and having a flexible peripheral lip disposed in bearing engagement with the endless member, biasing means for biasing each channel member toward the endless member, and vacuum means for creating a negative pressure in each recess.

22. A robotic apparatus for traversing a surface, comprising a supporting structure, a pair of parallel tracks, an endless member mounted for travel on each track, drive means for driving each endless member in a path of travel, each track including a first recess and a second recess, said recesses each having an open side facing the respective endless member, a plurality of vacuum cups mounted on each endless member, first port means providing communication between said first recess of each track and a first group of vacuum cups, second port means providing communication between the second recess of each track and a second group of said vacuum cups, vacuum means for creating a negative pressure in each recess, said vacuum means including a manifold mounted on each track and connected with a source of vacuum, and conduit means independently connecting said manifold with each of said recesses.

23. A robotic apparatus for traversing a surface, comprising a supporting structure, a pair of parallel tracks, an endless member mounted for travel on each track, drive means for driving each endless member in a path of travel, each track including a first recess and a scold recess, said recesses each having an open side facing the respective endless member, a plurality of vacuum cups mounted on each endless member, first port means providing communication between said first recess of each track and a first group of vacuum cups, second port means providing communication between the second recess of each track and a second group of said vacuum cups, vacuum means for creating a negative pressure in each recess, and valve means associated with each port means for closing said port means in the event ambient air leaks into said vacuum cup.

24. The apparatus of claim 23, wherein said valve means comprises a valve member disposed within said vacuum cup and movable between a closed position wherein the valve member encloses said port means and an open position.

25. The apparatus of claim 24, wherein said valve member is a flexible strip.

26. A robotic apparatus for traversing a surface, comprising a supporting frame, a pair of endless members mounted for movement on said frame, each endless member having an upper run and a lower run disposed to engage the surface, drive means operably connected to said endless members for moving said endless members in a path of travel to move said apparatus in a direction over the surface, a plurality of vacuum cups mounted on each endless member, vacuum means for creating a negative pressure in the vacuum cups disposed in the lower run of each endless member, an open bottom hood mounted on the frame and enclosing said endless members, a flexible seal mounted on the peripheral edge of the hood bordering the open bottom and disposed to sealingly engage said surface, negative pressure means separate from the vacuum means for creating a negative pressure within the hood in the event of failure of said vacuum means to prevent said apparatus from falling from said surface and means responsive to a decrease in vacuum generated by said vacuum means below a preselected value for operating said negative pressure means.

27. A robotic apparatus for traversing a surface, comprising a supporting frame, a pair of endless members mounted for movement on said frame, each endless member having an upper run and a lower run disposed to engage the surface, drive means operably connected to said endless members for moving said endless members in a path of travel to move said apparatus in a direction over the surface, a plurality of vacuum cups mounted on each endless member, each vacuum cup having an open side to be disposed in contact with said surface and having a passage communicating with said open side, vacuum means communicating with the passage of each vacuum cup for creating a negative pressure in the vacuum cups disposed in the lower run of each endless member, and valve means associated with each passage for closing said passage in the event ambient air leaks into said vacuum cup.

28. The apparatus of claim 27, wherein said valve means comprises a flexible valve member disposed within said vacuum cup and movable between a closed position wherein the valve member encloses said passage and an open position.

* * * * *

UNITED STATES PATENT AND TRADEMARK OFFICE
CERTIFICATE OF CORRECTION

PATENT NO.   : 5,487,440
DATED        : January 30, 1996
INVENTOR(S)  : HENRY SEEMANN It is certified that error appears in the above-indentified patent and that said Letters Patent is hereby corrected as shown below:

Col. 10, Line 57, CLAIM 23, Delete "scold" and substitute therefor ---second---

Signed and Sealed this

Sixth Day of August, 1996

Attest:

BRUCE LEHMAN

Attesting Officer

Commissioner of Patents and Trademarks